United States Patent [19]

Choi

[11] Patent Number: 5,444,588
[45] Date of Patent: Aug. 22, 1995

[54] MAGNETIC ERASING HEAD WITH STRUCTURE FOR RETAIN THE HEAD IN A HOLE OF THE BASE OF A VIDEO CASSETTE RECORDER AND PLUGGING THE HEAD INTO A CIRCUIT BOARD

[75] Inventor: Jae K. Choi, Incheon, Rep. of Korea

[73] Assignee: Daewoo Electronics Co., Ltd., Seoul, Rep. of Korea

[21] Appl. No.: 328,742

[22] Filed: Oct. 27, 1994

[30] Foreign Application Priority Data

Nov. 29, 1993 [KR] Rep. of Korea ............. 93-25464 U

[51] Int. Cl.⁶ ................................................ G11B 5/48
[52] U.S. Cl. ..................................... 360/104; 360/85
[58] Field of Search .................. 360/104, 85, 84, 128

[56] References Cited

U.S. PATENT DOCUMENTS 5,010,432  4/1991  Fukushima ..................... 360/84
5,016,130  5/1991  Hashiguchi ..................... 360/104

Primary Examiner—A. J. Heinz
Attorney, Agent, or Firm—Beveridge, DeGrandi Weilacher & Young

[57] ABSTRACT

Disclosed is a head structure for accomplishing a wireless structure of a video cassette recorder and for improving its assembling work. The head has a body for supporting a head portion for recording, erasing and/or reproducing data on a tape. A pair of neck portions are separately formed on a lower portion of the body for being necked in a through hole of a base in the video cassette recorder. A pair of head terminals are protrudingly and downwardly formed on a lower surface of the body, between the neck portions and a socket having a pair of socket grooves for receiving the head terminals and a pair of socket terminals on a lower surface thereof are provided. The socket is mounted on a wafer having a pair of grooves for receiving the socket terminals, the wafer being fixed on a printed circuit board of the video cassette recorder.

4 Claims, 3 Drawing Sheets

FIG. I (PRIOR ART)

MAGNETIC ERASING HEAD WITH STRUCTURE FOR RETAIN THE HEAD IN A HOLE OF THE BASE OF A VIDEO CASSETTE RECORDER AND PLUGGING THE HEAD INTO A CIRCUIT BOARD

BACKGROUND OF THE INVENTION

1. Field of the invention

The present invention relates to a head structure in a video cassette recorder (VCR). More particularly, the present invention relates to a magnetic erasing head having an improved structure for being connected to the main printed circuit board (PCB).

2. Description of the prior art

In general, a video cassette recorder includes the heads, such as a magnetic erasing head, a video head, an audio erasing head, an audio control head etc., in order to perform various functions. Among them, the magnetic erasing head erases the signal which has already been recorded on a video tape when a new image is recorded on the video tape which is being transmitted from a supply reel to a take-up reel.

FIG. 1 is a schematic view for illustrating a construction of a conventional video cassette recorder. In FIG. 1, reference numeral 1 denotes a magnetic erasing head, numeral 2 denotes a supply reel, numeral 3 denotes a take-up reel, numeral 4 denotes a PCB, numeral 5 denotes a wafer, numeral 6 denotes connector wires, numeral 7 denotes a video head, numeral 8 denotes an audio erasing head and numeral 9 denotes an audio control head.

Magnetic erasing head 1 erases the previously recorded image signal from the video tape (A) when a new image signal is to be recorded on the tape (A) which is being transmitted from the supply reel to the take-up reel.

The aforesaid erasing head is fixedly mounted on a main base (not shown) and electrically is connected to the main PCB (not shown) via connector wires 6. Such an erasing head attached on the main base is disclosed in the U.S. Pat. No. 4,517,613 (issued to Narito Shibaike et al). Further, the technique wherein the magnetic construction is changed in order to improve the erasing function is also disclosed in the U.S. Pat. Nos. 4,805,058 (issued to Giichi Takeuchi et al.) and 4,622,614 (issued to Keitaro Yamashita et al.). In the conventional erasing heads which were disclosed in the foregoing patents, PCB 4, wafer 5, connector wires 6, etc., should be provided additionally in order to transfer the signals between magnetic erasing head 1 and the main PCB. Therefore, the construction of the magnetic head for connecting with the main PCB becomes complicated and assembling work is difficult.

SUMMARY OF THE INVENTION

Therefore, it is an object of the present invention to provide a construction of a head in a video cassette recorder whereby a wireless construction thereof may be accomplished and the assembling work is improved.

For achieving the above object of the present invention, there is provided a head in a video cassette recorder comprising:

a head portion for recording, erasing and/or reproducing data on a tape;

a body for supporting the head portion;

a pair of neck portions separately formed on a lower portion of the body for being necked in a through hole of a base in the video cassette recorder;

a pair of head terminals protrudingly and downwardly formed on a lower surface of the body, between the neck portions;

a socket having a pair of socket grooves for receiving the head terminals and a pair of socket terminals on a lower surface thereof; and a wafer having a pair of grooves for receiving the socket terminals, the wafer being fixedly mounted on a printed circuit board of the video cassette recorder.

Since the magnetic erasing head can be easily connected to the main base, the efficiency of the assembling work may be improved. By using the wafer and socket, the electrical connection between the main PCB and the magnetic erasing head can be accomplished without the necessity of the connector wires and thereby the inner structure of the video cassette recorder can be simplified.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Hereinafter, the present invention will be explained in details with reference to the accompanying drawings.

Figure 1:
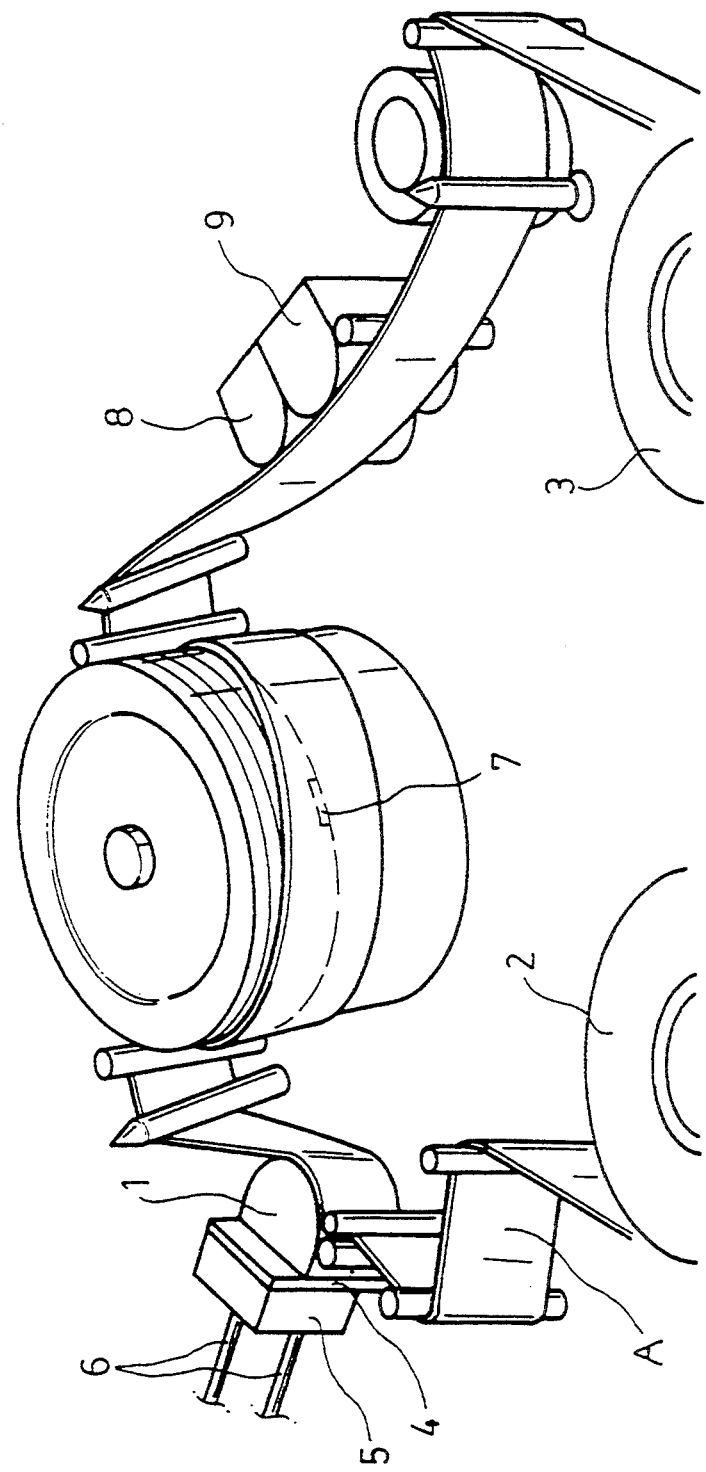
FIG. 1 is a schematic view for illustrating an operation mechanism in a conventional video cassette recorder.
Figure 2:
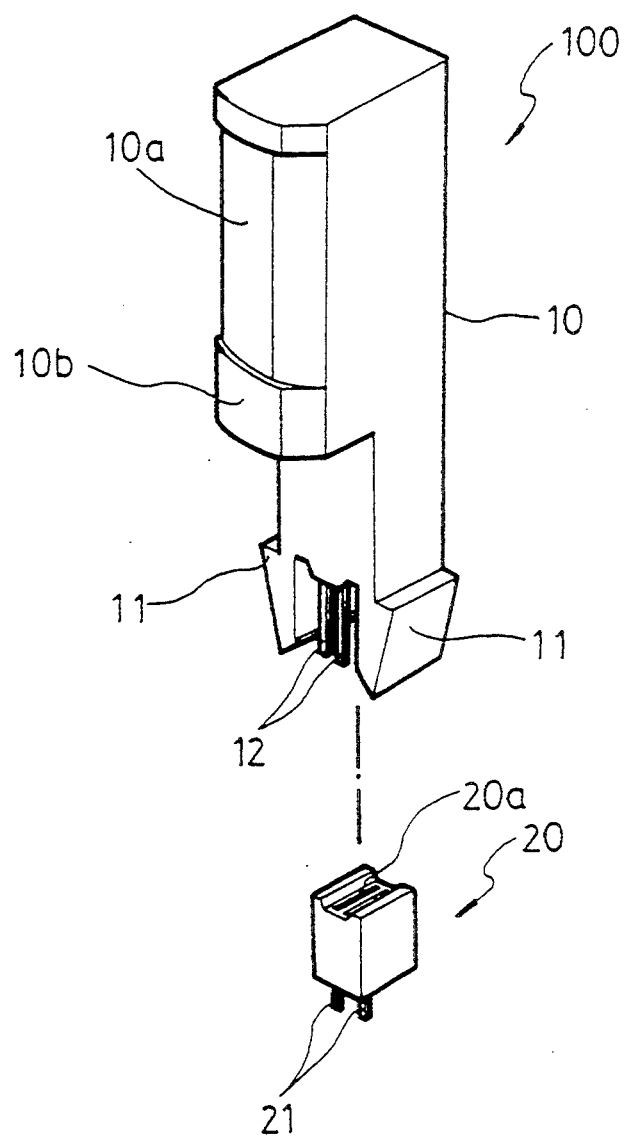
FIG. 2 is an exploded perspective view for illustrating a connection structure of a head according to an embodiment of the present invention.
Figure 3:
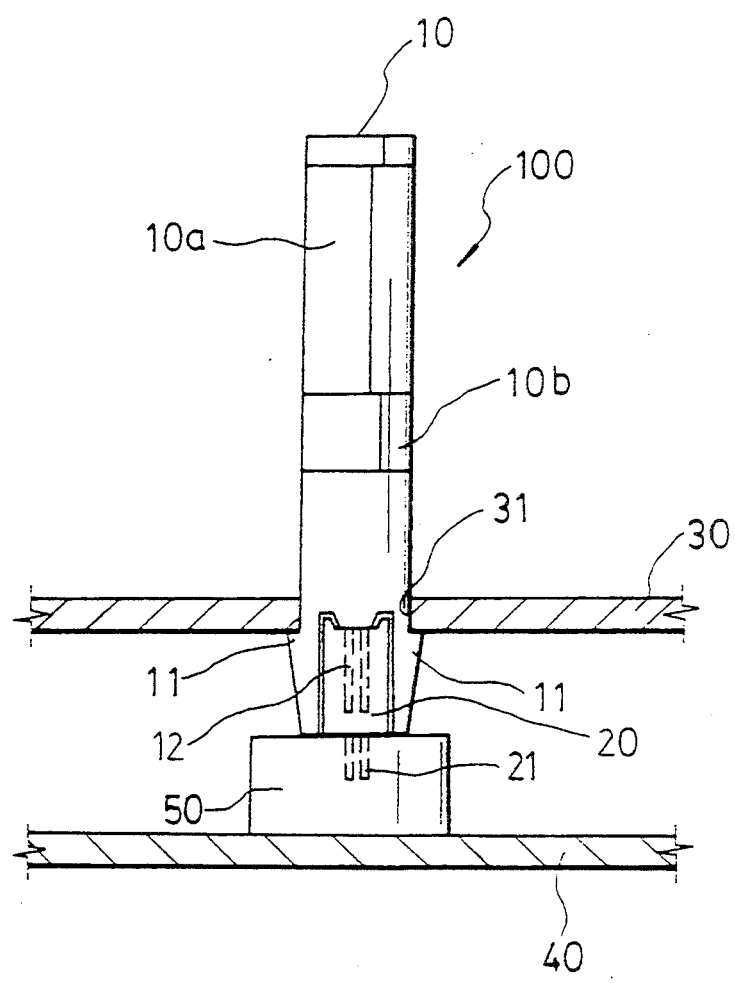
FIG. 3 is a cross-sectional view of a connection structure of the head as shown in FIG.2.

FIG. 2 is an exploded perspective view for illustrating a connection structure of a head according to an embodiment of the present invention and FIG. 3 is a cross-sectional view of the connection structure of the head as shown in FIG. 2. The shown head is a magnetic erasing head having an erasing function in the video cassette recorder.

A magnetic erasing head 100 as shown in FIGS. 2 and 3 includes a head body 10 for supporting a head portion 10a for erasing the recorded signal on a video tape. At a lower portion of head portion 10a, there is provided a guide portion 10b for guiding the tape. Under head body 10, a pair of neck portions 11 are provided separately on two sides, i.e., left and right portions of head body 10, in order to be necked in a through hole 31 of a main base 30. Between neck portions 11, a mesa-shaped projection of body 10 is formed and a pair of head terminals 12 are protectively formed downwardly from the projection.

Between neck portions 11, a socket 20 is inserted and is shaped to receive head terminals 12. Socket 20 has a reversed mesa-shaped recessed groove which corresponds to the mesa-shaped projection between neck portions 11 and in the recessed groove a pair of socket grooves 20a for receiving head terminals 12 are provided. Under socket 20, projected socket terminals 21 are provided. On a main PCB 40, a wafer 50 having a pair of grooves for receiving socket terminals is fixedly provided, which receives socket terminals 21 and fixes socket 20.

As shown above, socket 20 is installed separately from magnetic erasing head 100. However, socket 20 may be also integrally formed with magnetic erasing head 100 on the lower surface thereof.

Magnetic erasing head (10) is mounted on the video cassette recorder as below.

Under main base 30 (also, may be referred to as "deck") of a video cassette recorder, main PCB 40 is installed. Following this, wafer 50 for mounting socket 20 thereon is fixed on main PCB 40 and then terminals 21 of socket 20 are inserted in the grooves of wafer 50 so that socket 20 is fixed on wafer 50.

Then, while neck portions 11 of magnetic erasing head 100 are inserted in through hole 31 of main base 30, head terminals 12 are inserted in socket 20, thereby connecting magnetic erasing head 100 with main PCB 40.

In case that the user wants to detach magnetic erasing head 100 from main base 30, after removing socket 20 from wafer 50, magnetic erasing head 10 is pulled while simultaneously pushing from both outer sides of neck portions 11 towards inner direction. In this manner, magnetic erasing head 100 may be easily removed from through hole 31 of main base 30.

The same connection structure of such a magnetic erasing head may be adapted to heads and other connection apparatuses of the video cassette recorder.

Pursuant to the present invention, since the magnetic erasing head can be easily connected to the main base, the efficiency of the assembling work may be improved. Also, unlike the conventional art wherein connector wires were required in order to connect the magnetic erasing head with the main PCB, in the present invention by using the wafer and socket, the electrical connection between the main PCB and the magnetic erasing head can be accomplished and thereby the inner structure of the video cassette recorder can be simplified.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A head in a video cassette recorder, said head comprising:
    a head portion for recording, erasing and/or reproducing data on a tape;
    a body for supporting said head portion;
    a pair of neck portions separately formed on a lower portion of said body for being necked in a through hole of a base in the video cassette recorder;
    a pair of head terminals protrudingly and downwardly formed on a lower surface of said body, between said neck portions;
    a socket having a pair of socket grooves for receiving said head terminals and a pair of socket terminals on a lower surface thereof; and
    a wafer having a pair of grooves for receiving said socket terminals, said wafer being fixedly mounted on a printed circuit board of said video cassette recorder.

2. The head as claimed in claim 1, wherein said head is a magnetic erasing head for erasing data recorded on the tape.

3. The head as claimed in claim 1, wherein a mesa-shaped projection is formed between said neck portions, said head terminals are formed on the mesa-shaped projection, said socket has a reverse mesa-shaped recessed groove for receiving said mesa-shaped projection on an upper surface thereof and said socket groove is formed in a lower portion of said reverse mesa-shaped recessed groove.

4. The head as claimed in claim 1, said head further comprising a guide portion at a lower portion of said head portion for guiding a movement of the tape.

* * * * *